United States Patent
Segawa et al.

(10) Patent No.: US 12,264,095 B2
(45) Date of Patent: Apr. 1, 2025

(54) REFLECTIVE MEMBER AND GLASS LAYERED MEMBER PRODUCTION METHOD

(71) Applicants: SHIN-ETSU QUARTZ PRODUCTS CO., LTD., Tokyo (JP); HERAEUS QUARZGLAS GMBH & CO. KG, Hanau (DE)

(72) Inventors: Toru Segawa, Tokyo (JP); Kazuhiro Yamaguchi, Tokyo (JP); Tomonori Watanabe, Tokyo (JP); Daiki Fujita, Yamagata (JP)

(73) Assignees: Shin-Etsu Quartz Products Co., Ltd., Tokyo (JP); Heraeus Quarzglas GmbH & Co. KG, Hanau (DE)

(*) Notice: Subject to any disclaimer, the term of this patent is extended or adjusted under 35 U.S.C. 154(b) by 455 days.

(21) Appl. No.: 17/642,525

(22) PCT Filed: Aug. 17, 2020

(86) PCT No.: PCT/JP2020/031011
§ 371 (c)(1),
(2) Date: Mar. 11, 2022

(87) PCT Pub. No.: WO2021/049256
PCT Pub. Date: Mar. 18, 2021

(65) Prior Publication Data
US 2022/0324740 A1    Oct. 13, 2022

(30) Foreign Application Priority Data
Sep. 13, 2019    (JP) .................. 2019-167467

(51) Int. Cl.
B32B 15/04    (2006.01)
B32B 5/16    (2006.01)
(Continued)

(52) U.S. Cl.
CPC .............. *C03B 19/066* (2013.01); *B32B 5/16* (2013.01); *B32B 17/06* (2013.01); *B32B 17/068* (2013.01);
(Continued)

(58) Field of Classification Search
CPC ........................ C03B 19/066; B32B 2250/40
(Continued)

(56) References Cited

U.S. PATENT DOCUMENTS 8,920,878 B2 * 12/2014 Werdecker .............. C03C 17/02
427/376.2
2009/0308315 A1 * 12/2009 De Ridder ............... C09D 1/00
118/715
(Continued)

FOREIGN PATENT DOCUMENTS

JP    H08-119650    5/1996
JP    2002-160930    6/2002
(Continued)

OTHER PUBLICATIONS

JP2013035723A EPO Machine Translation Retrieved Jul. 17, 2024. (Year: 2024).*
(Continued)

*Primary Examiner* — Lauren R Colgan
(74) *Attorney, Agent, or Firm* — Dicke, Billig & Czaja, PLLC

(57) ABSTRACT

One aspect is a reflective member, which has a laminated structure in which transparent quartz glass members are formed on an upper surface and a lower surface of an opaque siliceous sintered powder layer. The opaque siliceous sintered powder layer has a thickness of 0.1 mm or more and a thickness distribution of ±0.05 mm or less. When a load is applied to each of the transparent quartz glass members on an upper surface and a lower surface of the laminated
(Continued)

structure in a direction parallel to the laminated structure, the reflective member is fractured at a load of 5 N or more per square centimeter. The laminated structure includes a semi-transparent portion having a width of 0.01 mm or less, which has an intermediate opacity between an opacity of the opaque siliceous sintered powder layer and an opacity of each of the transparent quartz glass members.

4 Claims, 4 Drawing Sheets

(51) Int. Cl.
  *B32B 17/06* (2006.01)
  *C03B 19/06* (2006.01)
  *C03B 23/203* (2006.01)
  *C03C 3/076* (2006.01)

(52) U.S. Cl.
  CPC .......... *C03B 19/063* (2013.01); *C03B 23/203* (2013.01); *B32B 2255/20* (2013.01); *B32B 2264/1021* (2020.08); *B32B 2307/416* (2013.01); *C03C 3/076* (2013.01)

(58) Field of Classification Search
  USPC ................................................. 428/426, 428
  See application file for complete search history.

(56) References Cited

U.S. PATENT DOCUMENTS

| 2010/0319608 | A1* | 12/2010 | Kanda ..................... C30B 15/10 65/33.4 |
| 2012/0237685 | A1* | 9/2012 | Werdecker .............. C03C 17/02 977/773 |

FOREIGN PATENT DOCUMENTS

| JP | 2004-067456 | 3/2004 |
| JP | 2009-084113 | 4/2009 |
| JP | 2009-302547 | 12/2009 |
| JP | 2013-035723 | 2/2013 |
| JP | 5679591 | 3/2013 |
| JP | 2017-154945 | 9/2017 |
| JP | 2017-165643 | 9/2017 |
| JP | 2018-531863 | 11/2018 |

OTHER PUBLICATIONS

Written Opintion and International Search Report in PCT/JP2020/031011 dated Nov. 2, 2020.

* cited by examiner

REFLECTIVE MEMBER AND GLASS LAYERED MEMBER PRODUCTION METHOD

CROSS REFERENCE TO RELATED APPLICATION

This Utility Patent Application claims priority under 35 U.S.C. § 371 to International Application Serial No. PCT/JP2020/031011, filed Aug. 17, 2020, which claims the benefit of Japanese Patent Application No. 2019-167467, filed Sep. 13, 2019; which are both incorporated herein by reference.

TECHNICAL FIELD

The present invention relates to a reflective member having a high reflectance, and a method of manufacturing a glass laminate member.

BACKGROUND ART

When a high-temperature atmosphere is required, for example, in an electric furnace, a heating atmosphere is generally covered with a heat insulating material, such as an alumina heat insulating material, in order to prevent inside heat from escaping outside. The same applies to a heat treatment furnace used in the semiconductor industry. Such heat insulating material contributes to heat retention and thermal uniformity by absorbing heat in itself. Accordingly, in controlling the temperature of a heater or the like, the heat retention property of the heat insulating material has adversely affected the rapid temperature-responsiveness of a product to be treated in the electric furnace. In particular, a heat treatment step in the semiconductor industry requires heat insulating means which prevents inside heat from escaping and has low heat absorption (a low heat capacity) in order to increase a throughput.

As countermeasures against the foregoing, for example, an opaque quartz glass sheet or cylindrical ring having a large number of micropores has hitherto been used as a heat shielding means. However, for example, it is required that many disc-shaped opaque quartz glass sheets be arranged next to each other at an inlet of the furnace in order to effectively perform heat shielding, resulting in an increase in heat capacity. Accordingly, in particular, a heat insulating and heat shielding means which shields heat rays from an inside of the furnace and efficiently reflects the heat rays, and has a low heat capacity (a small volume) has been required.

In view of the foregoing, for example, there is devised a product obtained by coating a quartz glass sheet with gold or a product as described in Patent Document 1 utilizing a reflective layer obtained by applying a silica slurry. However, for example, a metal-based reflective material, such as gold, was difficult to use particularly in applications in which metal impurities were unwanted, such as the semiconductor industry, while having high performance.

In addition, a method involving utilizing a silica slurry or the like requires a grain aggregate structure in which silica particles are partially fused to each other to form an aggregate in order to obtain high reflection performance. Such structure has problems of having instability in its strength and undergoing dissolution or peeling even through washing with water or a chemical liquid, and once the structure is contaminated, the contaminant is difficult to remove because the structure is porous. Thus, the method was difficult to use in applications for the semiconductor industry in which high purity is required.

In order to solve those problems, various attempts have been made. For example, in Patent Document 2, an attempt has been made to form a transparent silica layer on a slurry fired surface or the surface of a powder sintered body. In this method, it is required that at least heat for melting silica be applied in order to form the transparent silica layer. At this time, even a sintered powder layer, which serves as a reflective layer, is fused, resulting in a reduction in reflection performance, or strain occurs owing to a change in volume at the time of forming the transparent layer or a difference in expansion and contraction between the transparent layer and the sintered powder layer, leading to occurrence of cracks or the like and breakage. There was a problem of difficulty in controlling heating as described above.

Meanwhile, as proposed in Patent Document 3, an attempt has been made to form a quartz plate in which a heat reflective coating formed by applying a slurry is sandwiched between two quartz glass plates under a sealed state, and edge portions of the plates are together subjected to flame polishing or welded to each other. However, bonding by the welding covers only a periphery, and the coating and the plates are not strongly bonded. The quartz plate had a problem of being liable to be broken at the time of its production or its use as a heat reflective member.

PRIOR ART DOCUMENT

Patent Document 1: JP 5679591 B2
Patent Document 2: JP 5748605 B2
Patent Document 3: JP 2009-302547 A

SUMMARY OF THE INVENTION

Problems to be Solved by the Invention

An object of the present invention is to provide a reflective member, which can be prevented from being broken even in a high-temperature environment at the time of its production and its use while generating no dust at the time of its use, having a high fracture strength, and maintaining a high reflectance, and a method of manufacturing a glass laminate member suitable as the reflective member.

Means for Solving the Problems

In order to achieve the above-mentioned object, according to one embodiment of the present invention, there is provided a reflective member having a laminated structure in which transparent quartz glass members are formed on an upper surface and a lower surface of an opaque siliceous sintered powder layer, wherein the opaque siliceous sintered powder layer has a thickness of 0.1 mm or more and a thickness distribution of ±0.05 mm or less, wherein, when a load is applied to each of the transparent quartz glass members on an upper surface and a lower surface of the laminated structure in a direction parallel to the laminated structure, the reflective member is fractured at a load of 5 N or more per square centimeter, and wherein the laminated structure includes, in a boundary between the opaque siliceous sintered powder layer and each of the transparent quartz glass members of the laminated structure, a semi-transparent portion having a width of 0.01 mm or less, which has an intermediate opacity between an opacity of the opaque siliceous sintered powder layer and an opacity of each of the transparent quartz glass members.

The reflective member suitably has a reflectance of 60% or more at a wavelength of from 1,000 nm to 2,000 nm. In addition, the reflective member suitably has an in-plane reflectance distribution of ±5% at a specific wavelength.

The siliceous sintered powder layer preferably has a bulk density of from 1.3 g/cm$^3$ to 1.5 g/cm$^3$.

The reflective member may include a plurality of the siliceous sintered powder layers, and the siliceous sintered powder layers and the quartz glass members may be alternately laminated.

According to one embodiment of the present invention, there is provided a method of manufacturing a glass laminate member, in which quartz glass members are formed on an upper surface and a lower surface of a siliceous sintered powder layer,
the method including the steps of: preparing a slurry containing silica glass particles and water; flatly applying the slurry onto a surface of a first quartz glass member, followed by drying an application film of the slurry, to thereby obtain a silica powder layer having a flatness of 0.1 mm or less; placing a second quartz glass member having a surface having a flatness of 0.1 mm or less on the silica powder layer on the first quartz glass member, to thereby form an intermediate laminate; and heating the intermediate laminate to turn the silica powder layer into a siliceous sintered powder layer which has the particles fixed therein, which has a thickness of 0.1 mm or more, and which has a thickness distribution of ±0.05 mm, and to integrate the intermediate laminate, to thereby form a glass laminate member.

The glass laminate member suitably has a reflectance of 60% or more at a wavelength of from 1,000 nm to 2,000 nm.

The step of integrating the intermediate laminate preferably includes using a weight (pressing pressure) of 1 g or more per square centimeter.

The step of heating the intermediate laminate suitably includes adopting a heating temperature of from 800° C. to 1,350° C.

The second quartz glass member may be a quartz glass member having a dried silica powder layer formed thereon, and the intermediate laminate may be formed in such a manner that the silica powder layer on the first quartz glass member and the silica powder layer on the second quartz glass member are joined with each other.

In the step of forming the intermediate laminate, a plurality of the first quartz glass members each having a dried silica powder layer formed thereon are used, and the second quartz glass member is a quartz glass member free of a dried silica powder layer, the intermediate laminate is formed by laminating the plurality of first quartz glass members in such a manner that the silica powder layers are prevented from being brought into contact with each other, and by arranging the second quartz glass member on a silica powder layer of an uppermost first quartz glass member, and the glass laminate member to be formed is a glass laminate member including a plurality of siliceous sintered powder layers.

Advantageous Effects of the Invention

According to the present invention, the reflective member, which can be prevented from being broken even in a high-temperature environment at the time of its production and its use while generating no dust at the time of its use, having a high fracture strength, and maintaining a high reflectance, can be provided. In addition, the following significant effect is exhibited: the method of manufacturing a glass laminate member capable of easily manufacturing a glass laminate member suitable as the reflective member without the need for flame processing or a heating step, which is difficult to control, can be provided. Further, the following secondary effect is also exhibited: when the siliceous sintered powder layer is covered, for example, by a method involving welding a glass material to an end surface of the reflective member, a surface layer of the glass laminate member can be washed with a chemical liquid, such as hydrofluoric acid.

BRIEF DESCRIPTION OF THE DRAWINGS

FIG. 5(a) is an image taken with illumination in which a sample is irradiated with light from above and FIG. 5(b) is an image taken with transmitted illumination in which the sample is irradiated with light from back.

MODE FOR CARRYING OUT THE INVENTION

Figure 1A:
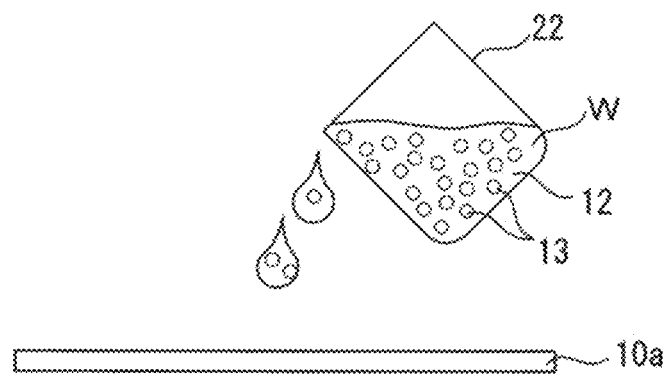
FIGS. 1(a)-(d) are schematic explanatory views for illustrating a method of manufacturing a glass laminate member according to one embodiment of the present invention.
Figure 1B:
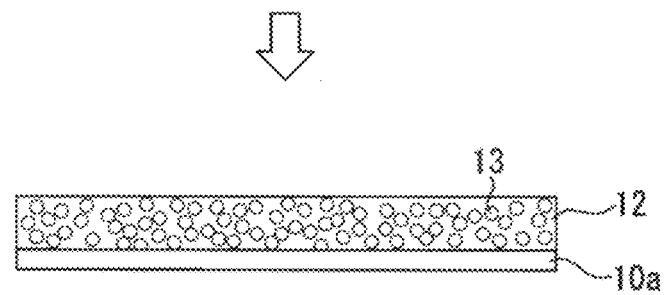
Figure 1C:
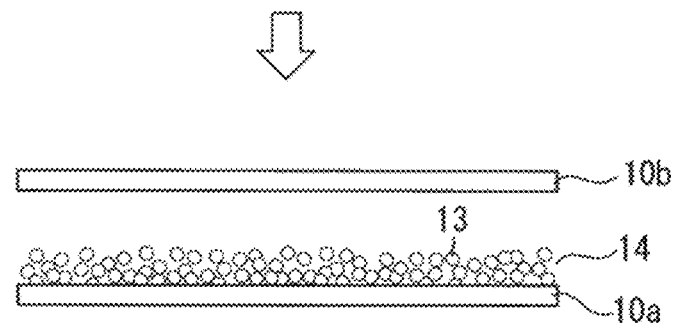
Figure 1D:
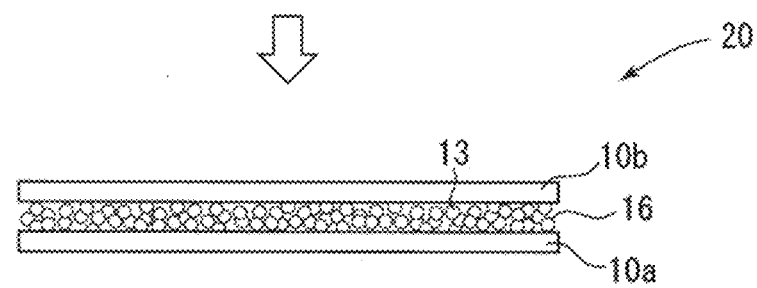

Embodiments of the present invention are described below with reference to the attached drawings. It goes without saying that illustrated examples are merely described as examples and various modifications may therefore be made without departing from the technical concept of the present invention.

FIG. 1 are schematic explanatory views for illustrating a method of manufacturing a glass laminate member according to one embodiment of the present invention. The method of the present invention is a method of manufacturing a glass laminate member 20, in which quartz glass members (10a, 10b) are formed on an upper surface and a lower surface of a siliceous sintered powder layer 16, the method including the steps of: preparing a slurry 12 containing silica glass particles 13 and water W [FIG. 1(a)]; flatly applying the slurry 12 onto a surface of a first quartz glass member 10a [FIG. 1(b)], followed by drying an application film of the slurry 12, to thereby obtain a silica powder layer 14 having a flatness of 0.1 mm or less; placing a second quartz glass member 10b having a surface having a flatness of 0.1 mm or less on the silica powder layer 14 on the first quartz glass member 10a, to thereby form an intermediate laminate [FIG. 1(c)]; and heating the intermediate laminate to turn the silica powder layer 14 into a siliceous sintered powder layer 16 which has the particles 13 fixed therein, which has a thickness of 0.1 mm or more, and which has a thickness distribution of ±0.05 mm, and to integrate the intermediate laminate, to thereby form a glass laminate member 20.

Known silica glass particles may be used as the silica glass particles 13 to be used in the slurry 12, but silica glass particles having an average particle diameter of from 0.1 μm to 5 μm are suitable. In addition, an organic binder capable of gelling by a thermal factor in an aqueous solution may be added to the slurry 12. The content of the silica glass particles 13 in the slurry 12 is not particularly limited, but is suitably from 50 mass % to 80 mass %. In FIG. 1, a container containing the slurry 12 is denoted by reference numeral 22.

A known member made of quartz glass may be used as the quartz glass member. The quartz glass member is not particularly limited, but is suitably a transparent quartz glass member. As the transparent quartz glass member, a colorless and transparent quartz glass member is preferred, and a colorless and transparent quartz glass member having a thickness of 2 mm and a light transmittance of 80% or more at a wavelength of from 400 nm to 2,000 nm is more preferred.

In addition, the quartz glass member is not particularly limited even in its shape and the like, but is suitably, for example, a member having a sheet shape, a disc shape, a hemispherical shape, or the like and having a uniform thickness.

It is preferred in terms of strength that the thickness of the quartz glass member be larger than that of the silica powder layer 14. Specifically, the thickness of the quartz glass member is preferably 0.5 mm or more. The upper limit value of the thickness of the quartz glass member is not particularly limited, but is practically 10 mm or less in terms of processing or the like.

An application method for the slurry 12 is not particularly limited as long as the method is capable of flatly applying the slurry 12 onto the surface of the quartz glass member 10*a*, but a method involving forming a flat application film by a scraping method with a scraper or the like is suitable. As used herein, the "flatly applying" means application with a small application thickness distribution. Specifically, it is suitable that a flat application film be formed so that the silica powder layer 14 obtained by drying an application film of the slurry 12 has a thickness distribution of 0.1 mm (±0.05 mm) or less. When the silica powder layer 14 has a large thickness distribution, its flatness becomes poor, and hence, in the step of placing the second quartz glass member 10*b* thereon, a portion in which a gap is generated is expanded, resulting in a reduction in adhesiveness. Thus, it becomes difficult to integrate the intermediate laminate by heating.

In the method of the present invention, the silica powder layer is formed by drying the application film of the slurry, and hence its handling becomes easy in the subsequent steps. When the application film is sandwiched between the quartz glass members before the drying is sufficiently performed, the thickness of the silica powder layer varies, or bubbles are entrapped in the silica powder layer, with the result that a thin portion is generated in the siliceous sintered powder layer. In addition, when the drying is performed insufficiently and a water content remains in a large amount, at the time of heating for bonding the quartz glass members thereto, the water content turns into a water vapor and expands at a bonded site, and the intermediate laminate may not be integrated. It is thus suitable that the water content in the slurry be sufficiently dried.

A drying method for the application film is not particularly limited, but for example, the drying may be performed in a heating furnace for drying. A drying temperature is desirably lower than the temperature at which the silica glass particles of the silica powder layer are fixed. When the drying temperature is equal to or higher than the temperature at which the particles of the silica powder layer are fixed, part of the particles of the silica powder layer are fixed. At the time of heating for bonding the quartz glass members thereto, the part of the particles of the silica powder layer have already been fixed, and hence the silica powder layer and each of the quartz glass members cannot be bonded to and integrated with each other in some cases. Specifically, the drying temperature is preferably from normal temperature (from 5° C. to 35° C.) to about 100° C.

The application film is dried to form the silica powder layer having a flatness of 0.1 mm or less, and the second quartz glass member 10*b* having a surface having a flatness of 0.1 mm or less is placed on the silica powder layer, to thereby form an intermediate laminate. As used herein, the "flatness" may be measured by placing a material to be measured on a flat surface plate and measuring the material with a laser displacement meter. The flatness of the silica powder layer may be determined from the in-plane height distribution of the silica powder layer.

In the step of heating the intermediate laminate, when a heating temperature is an excessively low temperature, the particles are liable to be peeled off without being fixed. When the heating temperature is an excessively high temperature, the siliceous sintered powder layer is increased in bulk density, and is increased in sintering degree and becomes partially transparent, and is thus reduced in reflectance. Accordingly, the heating temperature is suitably from 800° C. to 1,350° C., more suitably from 1,100° C. to 1,300° C. A heating atmosphere is not particularly limited, but an air atmosphere is preferred.

In addition, in order to achieve stronger bonding at the time of heating the intermediate laminate, a weight (pressing pressure) may be utilized, and a weight (pressing pressure) of 1 g or more per square centimeter is suitably used.

The siliceous sintered powder layer to be obtained preferably has a bulk density of from 1.3 g/cm$^3$ to 1.5 g/cm$^3$.

The thickness of the siliceous sintered powder layer is preferably 0.1 mm or more, more preferably from 200 μm to 1,000 μm. When the thickness of the siliceous sintered powder layer is too large, in the step of obtaining, by heating, the siliceous sintered powder layer which has the particles of the silica powder layer fixed therein, and integrating the silica powder layer and the quartz glass members with each other, the contraction amount of the silica powder layer at the time of sintering is increased with respect to the quartz glass members, with the result that the silica powder layer and the quartz glass members cannot be integrated with each other. As a result, peeling occurs, or cracks are liable to be generated in the siliceous sintered powder layer. In addition, the siliceous sintered powder layer preferably has a thickness distribution of ±0.05 mm or less.

While an example of manufacturing the glass laminate member 20 including one siliceous sintered powder layer 16 by using a quartz glass member free of a dried silica powder layer as the second quartz glass member 10*b* is illustrated in FIG. 1, a glass laminate member including a plurality of siliceous sintered powder layers 16 may be formed. As a method of manufacturing the glass laminate member including a plurality of siliceous sintered powder layers 16, there are given, for example: a method involving, in the step of forming the intermediate laminate, using a quartz glass member having a dried silica powder layer formed thereon as the second quartz glass member 10*b*, and forming the intermediate laminate in such a manner that the silica powder layer on the first quartz glass member and the silica powder layer on the second quartz glass member are joined with each other; a method involving using a plurality of first quartz glass members each having a dried silica powder layer formed thereon and using a quartz glass member free of a dried silica powder layer as the second quartz glass member, and forming the intermediate laminate by laminating the plurality of first quartz glass members in such a manner that the silica powder layers are prevented from being brought into contact with each other, and by arranging the second quartz glass member on the silica powder layer of the uppermost first quartz glass member; and a method involving forming the intermediate laminate by further laminating a quartz glass member having a dried silica powder layer formed thereon on the second quartz glass member 10b illustrated in FIG. 1(c) in such a manner that the silica powder layer is brought into contact with the second quartz glass member 10b. When the plurality of siliceous sintered powder layers 16 are included, the siliceous sintered powder layers may be the same or different from each other. For example, a plurality of siliceous sintered powder layers having different particle diameter distributions of the silica glass particles may be included.

By the above-mentioned method, the glass laminate member 20 which is prevented from occurrence of peeling, cracks, deformation, and the like, which is substantially free of a semi-transparent portion, which has an intermediate transparency between the transparency of the siliceous sintered powder layer 16 and the transparency of each of the quartz glass members 10a and 10b, between the siliceous sintered powder layer 16 and each of the quartz glass members 10a and 10b, and which includes the siliceous sintered powder layer having a satisfactory reflectance up to a boundary with each of the quartz glass members can be easily manufactured.

By the above-mentioned method of manufacturing a glass laminate member, a reflective member of the present invention can be easily manufactured.

The reflective member of the present invention is a reflective member having a laminated structure in which transparent quartz glass members (10a, 10b) are formed on an upper surface and a lower surface of an opaque siliceous sintered powder layer 16, wherein the opaque siliceous sintered powder layer 16 has a thickness of 0.1 mm or more and a thickness distribution of ±0.05 mm or less.

In the reflective member of the present invention, the opaque siliceous sintered powder layer acts as a reflective material. As the opaque siliceous sintered powder layer, a white and opaque siliceous sintered powder layer is suitable, and an opaque siliceous sintered powder layer which does not substantially transmit light, and for example, has a light transmittance of 1% or less at a wavelength of from 400 nm to 2,000 nm is more suitable.

In general, infrared heat rays are assumed as heat rays, but in order to suppress leakage of energy from a heat treatment space, it is advantageous to have reflection performance in as wide a range as possible from a visible region to an infrared region. The reflective member of the present invention suitably has a reflectance of 60% or more at a wavelength of from 1,000 nm to 2,000 nm. In addition, the reflective member suitably has an in-plane reflectance distribution of ±5% or less at a specific wavelength.

The siliceous sintered powder layer only needs to be a layer in which a distinct grain aggregate structure is formed, and may include voids between the particles. Reflection occurs at an interface between the voids and the particles, and hence it is contrarily suitable that the voids be moderately included. However, when the voids are too large, a fused portion between the particles is reduced, and strength as a layer cannot be maintained, with the result that peeling may occur. In addition, when the voids are small and the fused portion is increased, a reflection interface is reduced, with the result that reflection efficiency for heat rays is reduced. Accordingly, a volume ratio between the particles and the voids suitably falls within a range of from 5:5 to 8:2. In addition, the siliceous sintered powder layer suitably has a bulk density of from 1.3 g/cm$^3$ to 1.5 g/cm$^3$.

A reflection wavelength depends on, for example, the particle diameter of the grain aggregate, and hence also the particle diameter is an important factor. It is suitable that 50% of the grain aggregate be distributed within a range of from 0.1 μm to 5 μm.

The effects of the reflective material are obtained even when the material is not siliceous. However, silica, which has a small thermal expansion coefficient and also has high heat resistance, is most suitable for use at high temperature.

In addition, the thickness of the siliceous sintered powder layer is suitably 100 μm or more, more suitably from 200 μm to 1,000 μm. When the thickness of the siliceous sintered powder layer is small, reflection efficiency for heat rays is reduced. A high reflectance is desired for heat shielding and heat insulating characteristics for heat rays. A reflectance comparable to or higher than that of a reflective material based on a metal, such as gold, an existing reflective layer using a silica slurry, or opaque quartz glass including bubbles is effective. The reflectance is preferably prevented from falling below 60%, and is more preferably 80% or more.

While an example of forming the siliceous sintered powder layer by heating the silica powder layer obtained by applying and drying the slurry is illustrated in FIG. 1, a forming method for the siliceous sintered powder layer is not particularly limited in the reflective member of the present invention, and there may be adopted a known method, for example, a method involving directly placing powder and press-forming the powder in a layer form to form a silica powder layer, and heating the silica powder layer, to thereby form a siliceous sintered powder layer.

As the transparent quartz glass member of the reflective member, a transparent quartz glass member having a small thermal expansion coefficient as with the siliceous sintered powder layer is more preferred. In the case of opaque quartz glass containing bubbles in a large amount, there is a risk in that heat rays do not reach the siliceous sintered powder layer serving as a reflective layer, and may be scattered by the opaque quartz glass.

It is suitable that the thickness of the quartz glass member be larger than that of the siliceous sintered powder layer because the siliceous sintered powder layer requires voids, and hence the strength needs to be maintained by the quartz glass members which sandwich the siliceous sintered powder layer.

The reflective member of the present invention is, between the opaque siliceous sintered powder layer and each of the transparent quartz glass members of the laminated structure, substantially free of a semi-transparent portion (width: 0.01 mm or less), which has an intermediate opacity between the opacity of the opaque siliceous sintered powder layer and the opacity of each of the transparent quartz glass members, and an opaque silica sintered powder layer having a satisfactory reflectance up to a boundary with each of the transparent quartz glass members is formed.

In an adhesion interface between the sintered powder layer and each of the quartz glass members, when a fused portion is large, an interface on a grain aggregate side is reduced, resulting in a reduction in reflection efficiency, as in sintered powder. When the fused portion is small contrarily, there is a risk in that peeling from the interface may occur at the time of use. It is suitable that at least 1% or more and less than 50% of the area of the adhesion interface be fused.

The reflective member of the present invention is excellent in strength, and when a load is applied to the quartz glass members on the upper surface and the lower surface of the laminated structure in a direction parallel to the laminated structure, the reflective member is fractured at a load of 5 N or more, preferably 20 N or more per square centimeter.

The reflective member of the present invention is a member including one or more opaque siliceous sintered powder layers, and may be a member including a plurality of siliceous sintered powder layers, in which the siliceous sintered powder layers and the quartz glass members are alternately laminated. When the plurality of siliceous sintered powder layers are included, the siliceous sintered powder layers may be the same or different from each other. A reflection wavelength depends on the particle diameter in the siliceous sintered powder layer, and hence when a plurality of layers having different particle diameter distributions of grain aggregates are arranged, reflection can be efficiently achieved in a wide range.

The reflective member of the present invention is suitably used as heat insulating means for high-temperature heat treatment furnace in a heat treatment step of the semiconductor industry for which low dust generation, low metal impurities, and rapid temperature-responsiveness are required.

EXAMPLES

Now, the present invention is more specifically described by way of Examples. It goes without saying that Examples are given for illustrative purposes and should not be interpreted as limiting the present invention.

Example 1

A silica slurry was prepared by mixing synthesized silica glass particles having an average particle diameter of 1.5 μm in pure water so that the content of the silica glass particles was 60 mass %.

A first transparent quartz glass disc having an outer diameter of 350 mm and a thickness of 3 mm having been transparently polished was placed on a flat working table, and the silica slurry was poured onto the disc and applied thereto while being smoothened with a scraper so as to give a flat surface. The scraper was used with such a guide member as to give a height higher than the upper surface of the quartz glass disc by 0.2 mm.

The quartz glass disc after the application of the slurry was dried at room temperature (23° C.) for 5 hours or more. Thus, a silica powder layer (average thickness: 0.2 mm) was formed. The flatness of the silica powder layer was measured by the following method, and as a result, was found to be 0.07 mm.

<Measurement Method for Flatness>

The quartz glass disc with the (dried) silica powder layer was measured on a flat surface plate with a laser displacement meter. The flatness was determined from the in-plane height distribution of the silica powder layer.

A second transparent quartz glass disc having an outer diameter of 350 mm and a thickness of 3 mm having been transparently polished was placed on the dried silica powder layer. Thus, an intermediate laminate was formed. The flatness of the surface of the quartz glass disc placed on the dried silica powder layer was 0.05 mm. The flatness was measured in the same manner as described above.

Figure 2:
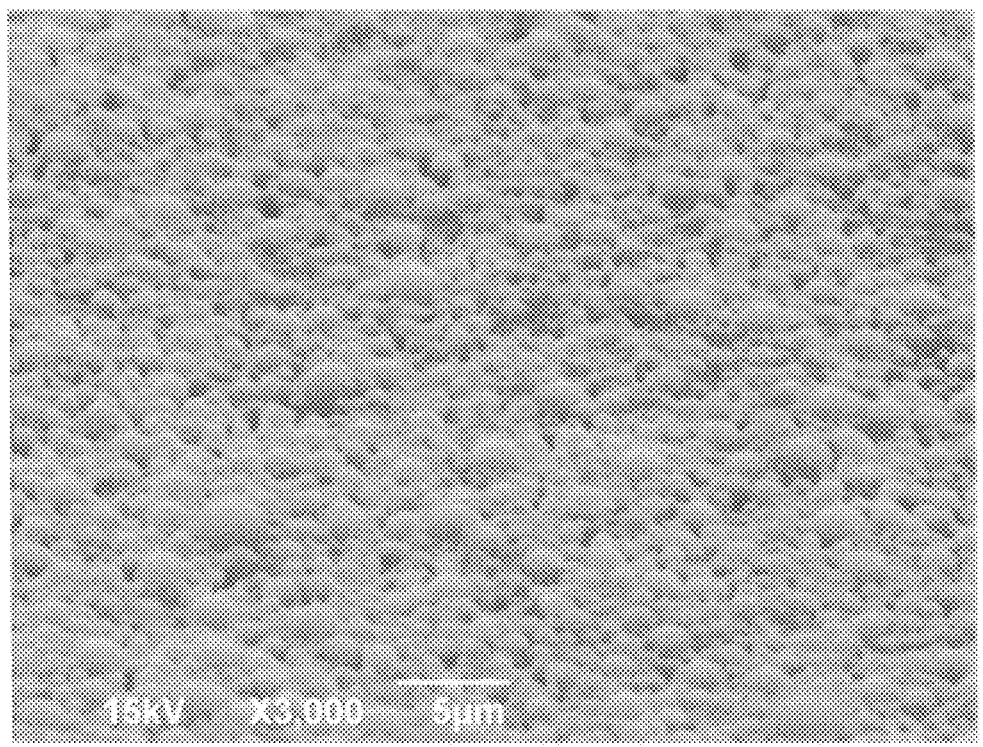
FIG. 2 is an electron micrograph of a siliceous sintered powder layer in a glass laminate member of Example 1.
Figure 3:
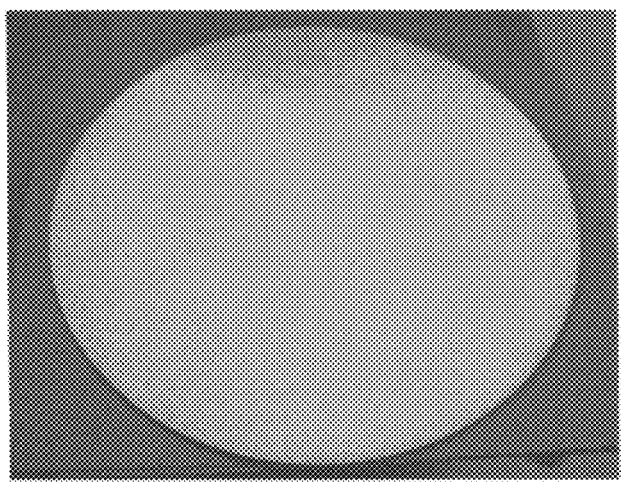
FIG. 3 is a photograph of the glass laminate member of Example 1.

After that, the intermediate laminate was heated at 1,100° C. for 3 hours in an air atmosphere. Thus, a glass laminate member including an opaque siliceous sintered powder layer and the transparent quartz glass discs sandwiching the opaque siliceous sintered powder layer was formed. The electron micrograph of the siliceous sintered powder layer in the resultant glass laminate member is shown in FIG. 2. In addition, the photograph of the resultant glass laminate member in its entirety is shown in FIG. 3.

The resultant glass laminate member was subjected to the following measurements.

<1. Measurement Methods for Thickness of Siliceous Sintered Powder Layer and Width of Boundary Between Siliceous Sintered Powder Layer and Quartz Glass Member>

Figure 4:
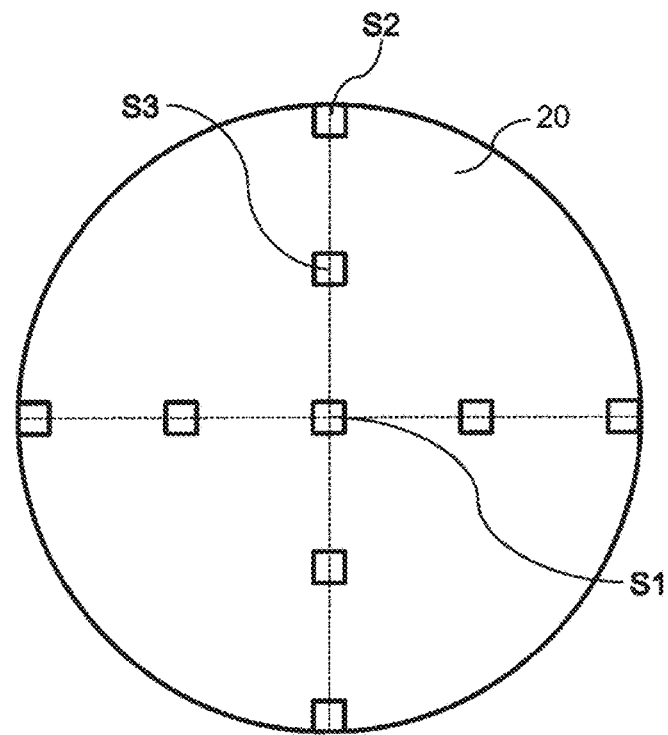
FIG. 4 is a plan view for illustrating measurement points for thickness measurement in Example 1.
Figure 5A:
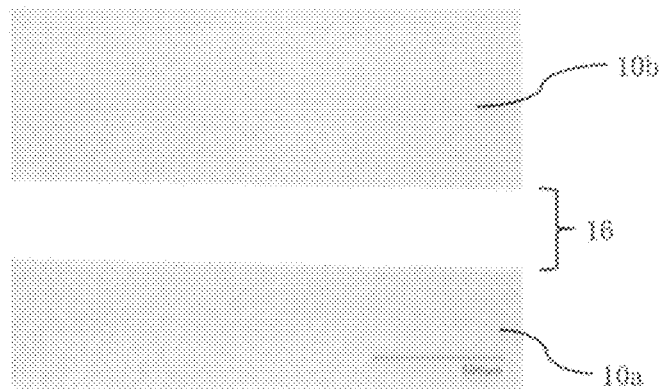
FIGS. 5(a)-(b) are micrographs each showing an image of the glass laminate member of Example 1 seen in a cross-section thereof.

Measurement points for thickness measurement in the glass laminate member are illustrated in FIG. 4. As illustrated in FIG. 4, the thickness measurement was performed at a total of 9 measurement points: 1 point (S1) at the center of the disc; 4 points (S2) near the outer periphery thereof provided every 90°; and 4 points (S3) as intermediate points between the center and the outer peripheral thereof provided every 90°. Measurement samples were cut out so as to have a width of 5 mm, and cross-sections thereof were each observed in an enlarged manner with a microscope and measured for a thickness. An image photograph of cross-sectional observation taken with illumination in which the sample is irradiated with light from above is shown in FIG. 5(a).

Figure 5B:
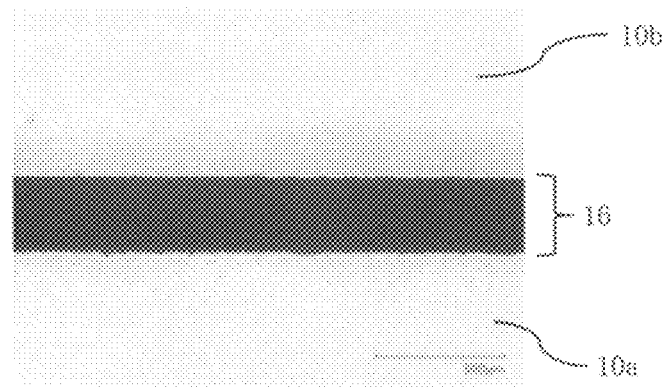

Similarly, cross-sectional observation was performed with transmitted illumination in which the sample was irradiated with light from back, and the width of a semi-transparent portion, which was, in a boundary between the siliceous sintered powder layer and each of the quartz glass discs, a portion varying in lightness between a darkly-seen opaque portion as the siliceous sintered powder layer and a lightly-seen transparent portion as the quartz glass disc, was measured (measurable lower limit value: 5 μm). An image photograph of the cross-sectional observation taken with transmitted illumination is shown in FIG. 5(b).

<2. Measurement Method for Bulk Density>

The bulk density of the siliceous sintered powder layer was calculated by weight/volume. The weight was calculated by subtracting the weight of the quartz glass members from the entire weight, and the volume was calculated by multiplying the application area by the (average) thickness of the silica powder layer.

<3. Reflectance Measurement>

The resultant glass laminate member was sampled at the same positions as the measurement points in the above-mentioned measurement of thickness of siliceous sintered powder layer, and samples for reflectance measurement were thus cut out. The reflectance was measured with a measurement device LAMBDA 950 (manufactured by Perkin Elmer Co., Ltd.) with an integrating sphere. In reflectance measurement, Spectralon reflectance target (manufactured by Labsphere) was used as a standard reflective material, and a relative reflectance was measured.

<4. Strength Test>

The resultant glass laminate member was sampled into a size of 2 cm×2 cm at the same positions as the measurement points in the above-mentioned measurement of thickness of siliceous sintered powder layer. Five samples were thus cut out and subjected to a strength test. The sample was set to a strength tester by fixing the quartz glass sheets on an upper side and a lower side thereof with a jig so that a load was applied to the jig in a direction parallel to the glass sheets. A load was applied thereto, and a load at which the sample was fractured was measured. A fracture load per square centimeter was calculated from the area of the sample (4 cm$^2$).

<5. Durability Test in High-Temperature Environment>

The resultant glass laminate member was heated to 1,000° C., retained for 1 hour, and then cooled to room temperature (23° C.) in an air atmosphere. The glass laminate member was heated by repeating the above-mentioned operation 10 times, and was observed for occurrence of breakage, peeling, and cracks.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer (from the edge to the center and in a circumferential direction) ranged from 0.16 mm to 0.23 mm, and the average thickness thereof was 0.2 mm. As shown in FIG. 5, in the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.3 g/cm$^3$.

The resultant glass laminate member had a reflectance of from 85% to 90% at a wavelength of 1,000 nm, a reflectance of from 71% to 76% at a wavelength of 2,000 nm, and a reflectance not falling below 71% at a wavelength of from 1,000 nm to 2,000 nm. The reflectance at a wavelength of from 1,000 nm to 2,000 nm tended to be minimized at 2,000 nm, and hence a reflectance at 2,000 nm was evaluated in the subsequent Examples.

The strength of the glass laminate member was from 10 N/cm$^2$ to 30 N/cm$^2$.

In the durability test of the glass laminate member in a high-temperature environment, no breakage, no peeling, and no cracks were found.

Example 2

Figure 6:
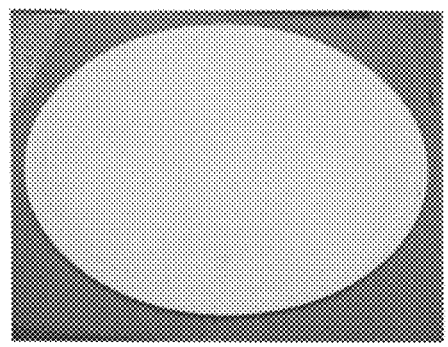
FIG. 6 is a photograph of a glass laminate member of Example 2.

A glass laminate member was obtained by the same method as in Example 1 except that the silica slurry was changed to a silica slurry prepared by the following method. The photograph of the resultant glass laminate member in its entirety is shown in FIG. 6. The resultant glass laminate member was subjected to the measurements in the same manner as in Example 1.

A silica slurry was prepared by mixing synthesized silica glass particles having an average particle diameter of 1.5 μm and methyl cellulose in pure water so that the contents of the silica glass particles and methyl cellulose were 60 mass % and 1 mass %, respectively.

The thickness of the silica powder layer was 0.2 mm on average, and the flatness of the silica powder layer was 0.07 mm.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer ranged from 0.18 mm to 0.23 mm, and the average thereof was 0.2 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.3 g/cm$^3$.

The glass laminate member had a reflectance of from 73% to 78% at a wavelength of 2,000 nm, and a reflectance not falling below 73% at a wavelength of from 1,000 nm to 2,000 nm.

The strength of the glass laminate member was from 15 N/cm$^2$ to 40 N/cm$^2$.

In the durability test of the glass laminate member in a high-temperature environment, no breakage, no peeling, and no cracks were found.

Example 3

A glass laminate member was obtained by the same method as in Example 2 except that, in the step of heating the intermediate laminate, the heat treatment was performed by using a weight of 5 g per square centimeter. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer ranged from 0.19 mm to 0.23 mm, and the average thereof was 0.2 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.5 g/cm$^3$.

The glass laminate member had a reflectance of from 72% to 77% at a wavelength of 2,000 nm, and a reflectance not falling below 72% at a wavelength of from 1,000 nm to 2,000 nm.

The strength of the glass laminate member was from 20 N/cm$^2$ to 40 N/cm$^2$.

In the durability test of the glass laminate member in a high-temperature environment, no breakage, no peeling, and no cracks were found.

Example 4

Two products in each of which a silica powder layer (average thickness: 0.2 mm, flatness: 0.07 mm) was formed on a transparent quartz glass disc were produced by the same method as in Example 2. The silica powder layer of one of the silica glass discs and the surface of the other one of the silica glass discs on which the silica powder layer was not formed were superimposed on each other. Further, a third transparent quartz glass sheet (flatness of its surface to be placed: 0.05 mm) having an outer diameter of 350 mm and a thickness of 3 mm having been transparently polished was placed on the exposed silica powder layer side. Thus, an intermediate laminate including two silica powder layers was formed. The intermediate laminate was subjected to heat treatment by the same method as in Example 3. Thus, a glass laminate member in which two opaque siliceous sintered powder layers (average: 0.2 mm) were each sandwiched between the quartz glass sheets was obtained. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layers in the glass laminate member were visually observed to be white and opaque. The thicknesses of portions of each of the two siliceous sintered powder layers ranged from 0.19 mm to 0.23 mm, and the average thicknesses thereof were each 0.2 mm. In the cross-sectional observation, the boundary between each of the opaque siliceous sintered powder layers and each of the transparent quartz glass sheets was clear, and the semi-transparent portion, such as an intermediate layer, was not found (width<0.005 mm). The bulk density of each of the siliceous sintered powder layers was 1.3 g/cm$^3$.

The glass laminate member had a reflectance of from 80% to 85% at a wavelength of 2,000 nm, and a reflectance not falling below 80% at a wavelength of from 1,000 nm to 2,000 nm.

The strength of the glass laminate member was from 20 N/cm$^2$ to 40 N/cm$^2$.

In the durability test of the glass laminate member in a high-temperature environment, no breakage, no peeling, and no cracks were found.

Example 5

Two products in each of which a silica powder layer (average thickness: 0.2 mm, flatness: 0.07 mm) was formed on a transparent quartz glass disc were produced by the same method as in Example 2. The silica powder layers of both the silica glass discs were superimposed on each other. Thus, an intermediate laminate including two consecutive silica powder layers was formed. The intermediate laminate was subjected to heat treatment by the same method as in Example 3. Thus, a glass laminate member including two consecutive opaque siliceous sintered powder layers (average: 0.2 mm) was obtained. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layers in the glass laminate member were visually observed to be white and opaque. The thicknesses of portions of the two siliceous sintered powder layers ranged from 0.38 mm to 0.44 mm, and the average thereof was 0.4 mm. In the cross-sectional observation, the boundary between each of the opaque siliceous sintered powder layers and each of the transparent quartz glass sheets was clear, and the semi-transparent portion, such as an intermediate layer, was not found (width<0.005 mm). The bulk density of the two siliceous sintered powder layers was 1.4 g/cm$^3$.

The glass laminate member had a reflectance of from 78% to 83% at a wavelength of 2,000 nm, and a reflectance not falling below 78% at a wavelength of from 1,000 nm to 2,000 nm.

The strength of the glass laminate member was from 20 N/cm$^2$ to 45 N/cm$^2$.

In the durability test of the glass laminate member in a high-temperature environment, no breakage, no peeling, and no cracks were found.

Example 6

A glass laminate member was obtained by the same method as in Example 2 except that, in the step of heating the intermediate laminate, the heat treatment was performed at 1,350° C. for 3 hours in an air atmosphere by using a weight of 5 g per square centimeter. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer ranged from 0.16 mm to 0.21 mm, and the average thereof was 0.2 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.5 g/cm$^3$.

The glass laminate member had a reflectance of from 65% to 70% at a wavelength of 2,000 nm, which was slightly lower than that of Example 1 or the like, but had a reflectance not falling below 65% at a wavelength of from 1,000 nm to 2,000 nm.

The strength of the glass laminate member was from 40 N/cm$^2$ to 80 N/cm$^2$.

In the durability test of the glass laminate member in a high-temperature environment, no breakage, no peeling, and no cracks were found.

Example 7

A glass laminate member was obtained by the same method as in Example 2 except that, in the step of heating the intermediate laminate, the heat treatment was performed at 800° C. for 3 hours in an air atmosphere by using a weight of 5 g per square centimeter. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer ranged from 0.19 mm to 0.23 mm, and the average thereof was 0.2 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.3 g/cm$^3$.

The glass laminate member had a reflectance of from 73% to 78% at a wavelength of 2,000 nm, and a reflectance not falling below 73% at a wavelength of from 1,000 nm to 2,000 nm.

The strength of the glass laminate member was from 5 N/cm² to 10 N/cm², and the glass laminate member had a lower strength than in Example 1 or the like.

In the durability test of the glass laminate member in a high-temperature environment, no breakage, no peeling, and no cracks were found.

Example 8

A glass laminate member was obtained by the same method as in Example 3 except that, in the step of applying the silica slurry onto the quartz glass disc, the scraper was used with such a guide member as to give a height higher than the upper surface of the quartz glass disc by 0.15 mm. The silica powder layer formed on the quartz glass disc had an average thickness of 0.15 mm and a flatness of 0.07 mm. The resultant glass laminate member was subjected to the measurements in the same manner as in Example 1.

No peeling, no cracks, and no deformation were found in the resultant glass laminate member.

The transparent quartz glass sheets on the upper surface and the lower surface of the glass laminate member were visually observed to be colorless and transparent. In addition, the siliceous sintered powder layer in the glass laminate member was visually observed to be white and opaque. The thicknesses of portions of the siliceous sintered powder layer ranged from 0.1 mm to 0.17 mm, and the average thereof was 0.15 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.4 g/cm³.

The glass laminate member had a reflectance of from 60% to 65% at a wavelength of 2,000 nm, and a reflectance not falling below 60% at a wavelength of from 1,000 nm to 2,000 nm.

The strength of the glass laminate member was from 20 N/cm² to 40 N/cm².

In the durability test of the glass laminate member in a high-temperature environment, no breakage, no peeling, and no cracks were found.

Comparative Example 1

A silica slurry was prepared by mixing synthesized silica glass particles having an average particle diameter of 1.5 μm and methyl cellulose in pure water so that the contents of the silica glass particles and methyl cellulose were 60 mass % and 1 mass %, respectively.

A transparent quartz glass disc having an outer diameter of 350 mm and a thickness of 3 mm having been transparently polished was placed on a flat working table, and the silica slurry was poured onto the disc and applied thereto while being smoothened with a scraper so as to give a flat surface. The scraper was used with such a guide member as to give a height higher than the upper surface of the quartz glass disc by 1.8 mm.

Figure 7:
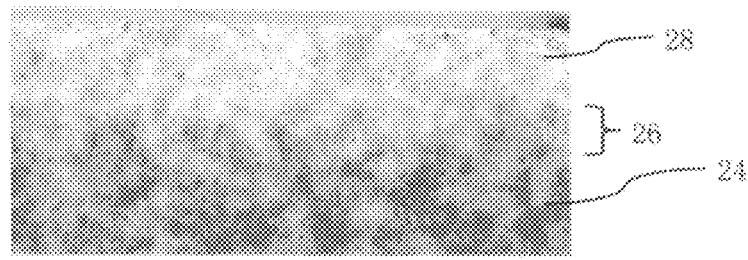
FIG. 7 is an image photograph of cross-sectional observation of a sample of Comparative Example 1 taken with transmitted illumination.

The quartz glass disc after the application of the slurry was dried at room temperature (23° C.) for 5 hours or more. Thus, a silica powder layer (average thickness: 1.5 mm) was formed. The surface of the dried silica powder layer was heated with burner flame to be made transparent. Thus, a multi-layered body was obtained. Cracks occurred in part of the silica powder layer during the heating with a burner, and bubbles remained in the surface having been made transparent with burner flame. The resultant multi-layered body was subjected to the measurements in the same manner as in Example 1. An image photograph of cross-sectional observation of an upper portion of the sample of Comparative Example 1 taken with transmitted illumination is shown in FIG. 7.

The thickness of a transparent layer 28 having been made transparent with burner flame was from 0.1 mm to 0.5 mm and had a large variation. As shown in FIG. 7, a semi-transparent portion 26 (width: 0.1 mm or more) was generated between an opaque silica powder layer 24 and the transparent layer 28 formed with burner flame, and a boundary between the silica powder layer 24 and the transparent layer 28 was unclear.

Comparative Example 2

A silica slurry was prepared by mixing synthesized silica glass particles having an average particle diameter of 1.5 μm and methyl cellulose in pure water so that the contents of the silica glass particles and methyl cellulose were 60 mass % and 1 mass %, respectively.

A first transparent quartz glass disc having an outer diameter of 350 mm and a thickness of 3 mm having been transparently polished was placed on a flat working table, and the silica slurry was poured onto the disc and applied thereto while being smoothened with a scraper so as to give a flat surface. The scraper was used with such a guide member as to give a height higher than the upper surface of the quartz glass disc by 0.3 mm.

A second transparent quartz glass sheet (flatness of its surface to be placed: 0.05 mm) having an outer diameter of 350 mm and a thickness of 3 mm having been transparently polished was placed on the quartz glass disc after the application of the slurry before the silica application film was dried. Thus, an intermediate body was formed. It was found that about 10 bubbles with the maximum bubble size of 3 mm were entrapped between the sheet having been placed and the slurry.

The intermediate body was heated at 1,100° C. for 5 hours in an air atmosphere through use of a weight of 5 g per square centimeter, but peeling occurred owing to thermal expansion of the entrapped bubbles, and the silica application film and each of the quartz glass discs were not able to be bonded to each other.

Comparative Example 3

A silica slurry was prepared by mixing synthesized silica glass particles having an average particle diameter of 1.5 μm and methyl cellulose in pure water so that the contents of the silica glass particles and methyl cellulose were 60 mass % and 1 mass %, respectively.

A first transparent quartz glass disc having an outer diameter of 350 mm and a thickness of 3 mm having been transparently polished was placed on a flat working table. The silica slurry was poured onto the quartz glass disc and left for 1 minute, and then the redundant slurry was poured off therefrom by inclining the disc.

The quartz glass disc after the application of the slurry was dried at room temperature (23° C.) for 5 hours or more. While application unevenness was generated by flowing marks of the slurry, a siliceous powder layer was formed. The thicknesses of portions of the siliceous powder layer ranged from 0.18 mm to 0.47 mm, and the average thickness thereof was 0.3 mm. The flatness of the silica powder layer was 0.2 mm.

A second transparent quartz glass sheet (flatness of its surface to be placed: 0.05 mm) having an outer diameter of 350 mm and a thickness of 3 mm having been transparently polished was placed on the dried silica powder layer. Thus, an intermediate laminate was formed. The intermediate laminate was subjected to heat treatment by the same method as in Example 3. Thus, a glass laminate member was obtained.

The resultant glass laminate member was liable to cause peeling, and some of its samples caused peeling at the time of sampling for measurements. Samples not having caused peeling were used to be subjected to the measurements.

The thicknesses of portions of the siliceous sintered powder layer ranged from 0.23 mm to 0.36 mm, and the average thickness thereof was 0.3 mm. In the cross-sectional observation, the boundary between the opaque siliceous sintered powder layer and each of the transparent quartz glass sheets was clear, and the semi-transparent portion, such as an intermediate layer, was not found (width<0.005 mm). The bulk density of the siliceous sintered powder layer was 1.3 g/cm$^3$.

The glass laminate member had a reflectance of from 74% to 85% at a wavelength of 2,000 nm, and a reflectance not falling below 74% at a wavelength of from 1,000 nm to 2,000 nm.

The strength of the glass laminate member was from 2 N/cm$^2$ to 10 N/cm$^2$, and the glass laminate member had a low strength.

REFERENCE SIGNS LIST

10$a$, 10$b$: quartz glass member,
12: slurry,
13: silica glass particle,
14, 24: silica powder layer,
16: siliceous sintered powder layer,
20: glass laminate member,
22: container,
26: semi-transparent portion,
28: transparent layer,
S1, S2, S3: measurement point,
W: water.

The invention claimed is:

1. A reflective member comprising:
   a laminated structure in which transparent quartz glass members are formed on an upper surface and a lower surface of an opaque siliceous sintered powder layer,
   wherein the opaque siliceous sintered powder layer has a thickness of 0.1 mm or more and a thickness distribution of ±0.05 mm or less,
   wherein, when a load is applied to each of the transparent quartz glass members on an upper surface and a lower surface of the laminated structure in a direction parallel to the laminated structure, the reflective member is fractured at a load of 5 N or more per square centimeter, and
   wherein the laminated structure includes, in a boundary between the opaque siliceous sintered powder layer and each of the transparent quartz glass members of the laminated structure, a semi-transparent portion having a width of 0.01 mm or less, which has an intermediate opacity between an opacity of the opaque siliceous sintered powder layer and an opacity of each of the transparent quartz glass members.

2. The reflective member according to claim 1, wherein the reflective member has a reflectance of 60% or more at a wavelength of from 1,000 nm to 2,000 nm.

3. The reflective member according to claim 1, wherein the siliceous sintered powder layer has a bulk density of from 1.3 g/cm$^3$ to 1.5 g/cm$^3$.

4. The reflective member according to claim 1,
   wherein the reflective member comprises a plurality of the siliceous sintered powder layers, and
   wherein the siliceous sintered powder layers and the quartz glass members are alternately laminated.

* * * * *